United States Patent
Lou

(10) Patent No.: US 9,477,565 B2
(45) Date of Patent: Oct. 25, 2016

(54) DATA ACCESS WITH TOLERANCE OF DISK FAULT

(71) Applicant: Tencent Technology (Shenzhen) Company Limited, Shenzhen, Guangdong (CN)

(72) Inventor: Jibing Lou, Shenzhen (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 263 days.

(21) Appl. No.: 14/259,106

(22) Filed: Apr. 22, 2014

(65) Prior Publication Data

US 2014/0229763 A1 Aug. 14, 2014

Related U.S. Application Data

(63) Continuation of application No. PCT/CN2013/088170, filed on Nov. 29, 2013.

(30) Foreign Application Priority Data

Jan. 22, 2013 (CN) .......................... 2013 1 0027284

(51) Int. Cl.
*G06F 11/00* (2006.01)
*G06F 11/20* (2006.01)

(52) U.S. Cl.
CPC ....... *G06F 11/2097* (2013.01); *G06F 11/2094* (2013.01); *G06F 11/2035* (2013.01)

(58) Field of Classification Search
CPC ........... G06F 11/2056; G06F 11/2094; G06F 11/2097
USPC .............................................. 714/6.23, 6.32
See application file for complete search history.

(56) References Cited

U.S. PATENT DOCUMENTS

| | | | | |
|---|---|---|---|---|
| 7,243,115 B2* | 7/2007 | Manley | ............... | G06F 11/2066 |
| 7,546,429 B1* | 6/2009 | Kiselev | ............... | G06F 11/1435 |
| | | | | 711/162 |
| 7,653,832 B2* | 1/2010 | Faibish | ................ | G06F 3/0622 |
| | | | | 714/6.11 |
| 7,814,272 B2* | 10/2010 | Barrall | ................ | G06F 3/0607 |
| | | | | 711/114 |
| 8,266,136 B1* | 9/2012 | Pogde | ............... | G06F 17/30091 |
| | | | | 707/711 |

(Continued)

FOREIGN PATENT DOCUMENTS

WO 2006050455 A2 5/2006

OTHER PUBLICATIONS

International Searching Authority, The State Intellectual Property Office, Form PCT/ISA/237 for IA Application No. PCT/CN2013/088170, International Search Report and Written Opinion, Jan. 23, 2014.

*Primary Examiner* — Elmira Mehrmanesh
(74) *Attorney, Agent, or Firm* — BrainSpark Associates, LLC

(57) ABSTRACT

A method for data access is disclosed. The method includes: receiving a file access request; acquiring one or more node lists corresponding to the file, wherein each node list comprises at least two nodes, and the mutually corresponding disks between the respective nodes store the same contents; accessing data chunks included in the file from the respective nodes selected from each of the node lists; and when an accessing from a certain node fails, selecting another node from the node list that comprises the certain node, and accessing a respective data chunk included in the file from the selected node according to the identifier of the file. A system and a device with tolerance of disk fault are also disclosed.

22 Claims, 6 Drawing Sheets

(56) References Cited

U.S. PATENT DOCUMENTS

| | | |
|---|---|---|
| 9,170,892 B2 * | 10/2015 | Nightingale ........ G06F 11/1658 |
| 2001/0037371 A1 | 11/2001 | Ohran |
| 2004/0019821 A1 | 1/2004 | Chu et al. |
| 2005/0240628 A1 * | 10/2005 | Jiang ................ G06F 17/30067 |
| 2011/0016353 A1 * | 1/2011 | Mikesell ............. G06F 11/1435 714/15 |
| 2012/0266011 A1 * | 10/2012 | Storer .................. G06F 11/008 714/1 |

* cited by examiner

DATA ACCESS WITH TOLERANCE OF DISK FAULT

CROSS-REFERENCE TO RELATED APPLICATIONS

This application is a U.S. continuation application of International Application PCT/CN2013/088170, with an international filing date of Nov. 29, 2013, which claims the priority benefit of Chinese Patent Application No. 201310027284.9 filed on Jan. 22, 2013, the disclosures of which are both incorporated by reference herein in their entireties for all intended purposes.

FIELD OF THE INVENTION

The invention relates to field of computer, and in particular, to a disk fault tolerance method, device and system.

BACKGROUND

Disk fault tolerance refers to a technology in which when data or files are corrupted or lost in a disk system, the disk system can automatically recover the corrupted or lost data and files to the state before the accident occurs such that the system can operate continuously.

In the prior art, disk fault tolerance generally employs RAID (Redundant Array of Independent Disks), which uses a plurality of disks and ensures data reliability by a certain checking mechanism; the disk fault tolerance technology can be classified into a plurality of types 0-7 according to its implementation manner and fault tolerance performance, among which RAID 1 and RAID 5 are most well known. In the prior art I, RAID 1 uses two disks for backup, each of which is a slave disk of the other, wherein during data writing, the data are written simultaneously to the two disks, and during data accessing, data in the master disk will be accessed first, and if the access fails, data in the backup disk will be accessed. This technology is easy to achieve and provides a high data availability, and when the master disk is offline, a recovery can be conducted from the backup disk without affecting the performance. In the prior art II, RAID 5 strips the disks and data, wherein data accessing is conducted simultaneously with respect to a plurality of disks, and parity checking chunks are distributed among the plurality of disks. If one of these disks fails, a recovery can be performed according to information from the other disks. For an array with N disks, this technology can achieve a disk space efficiency of (N−1)/N.

However, the inventors of the present invention have found that there exists at least the following problem in the prior arts.

For RAID 1, since only one of the two disks offers service at one time, the disk utilization efficiency is only 50%. RAID 5 has a poor writing performance, wherein during each writing, old data and old parity checking data need to be accessed first, and then new data are written and new parity checking data would be generated and written. Moreover, RAID 5 has a high complexity of implementation, and thus RAID controller and RAID metadata information issues may be a bottleneck of the overall system, and RAID 5 can do nothing about the system failure such as simultaneous storage of multiple disks, machine power down or power off.

SUMMARY OF THE INVENTION

In order to improve disk availability and read-write performance, the present invention provides disk fault tolerance method, device and system. The technical solutions are as follows:

In one aspect, there is provided a disk fault tolerance method, which comprises:

receiving a file access request, in which an identifier of the file is carried;

according to a pre-stored correspondence between identifiers of files and node lists as well as the identifier of the file, acquiring one or more node lists corresponding to the file, wherein each node list comprises at least two nodes, each node comprises a plurality of disks, there is a one-to-one correspondence between the disks included in the respective nodes, and the mutually corresponding disks between the respective nodes store the same contents;

selecting a node from each of the acquired node lists respectively, and accessing data chunks included in the file from the respective nodes selected from each of the node lists according to the identifier of the file; and when an accessing from a certain node fails, selecting another node from the node list that comprises the certain node, and accessing a respective data chunk included in the file from the selected node according to the identifier of the file.

In another aspect, the present invention provides a disk fault tolerance device which comprises:

a receiving module, be configured to receive a file access request, in which an identifier of the file is carried;

a first acquiring module, configured to acquire one or more node lists corresponding to the file, according to a pre-stored correspondence between identifiers of files and node lists as well as the identifier of the file, wherein each node list comprises at least two nodes, each node comprises a plurality of disks, there is a one-to-one correspondence between the disks included in the respective nodes, and the mutually corresponding disks between the respective nodes store the same contents;

an accessing module, configured to select a node from each of the acquired node lists respectively, and access data chunks included in the file from the respective nodes selected from each of the node lists according to the identifier of the file; and a fault tolerance module, configured to select another node from the node list that comprises the certain node, and access a respective data chunk included in the file from the selected node according to the identifier of the file, when an accessing from a certain node fails.

In another aspect, the present invention provides a disk fault tolerance system which comprises a client, a storage server cluster and a management server; wherein the client is configured to send a file access request to the management server, wherein an identifier of the file is carried in the file access request;

the storage server cluster comprises a plurality of storage server groups, wherein each storage server group comprises at least two storage servers, each storage server comprises a plurality of disks, there is a one-to-one correspondence between the disks included in the respective storage servers, and the mutually corresponding disks between the respective storage servers store the same contents; and the management server is configured to receive the file access request; acquire one or more storage server groups corresponding to the file according to a pre-stored correspondence between identifiers of files and the storage server groups included in the storage server cluster as well as the identifier of the file; select respective storage servers from each of the acquired storage server groups, and access data chunks included in the file from the respective storage servers selected from each of the storage server groups according to the identifier of the file; and when an accessing from a certain storage server fails, select another storage server from the storage server group that comprises the certain storage server, and access respective data chunk included in the file from the selected storage server according to the identifier of the file.

The advantageous effects of the technical solutions of embodiments of the present invention are:

it proposes a pairing storage technology in combination with advantages of the dual machine duplexing mechanism, wherein a plurality of completely independent machines are mutually backed up from a node level to a disk level. This solves problems of data read-write fault, a disk fault, single node fault and the like in a large-scale distributed storage system, ensures a data reliability in any scene, and improves a disk availability and read-write performance.

DESCRIPTION OF THE DRAWINGS

To expressly illustrate the technical solutions of embodiments of the present invention, a brief of the drawings used in depicting the embodiments is presented below. Obviously, the drawings described below only are some embodiments of the present invention, and on these grounds, other drawings may occur to a person skilled in the art without any creative effort.

DETAILED DESCRIPTION

In order to more clearly render the purposes, technical solutions and advantages of the present invention, several embodiments of the present invention are described below in connection with the drawings. The number assigned to each of the embodiments is only for convenience of the description, not for representing goodness/badness of each of the embodiments.

First Embodiment

Figure 1:
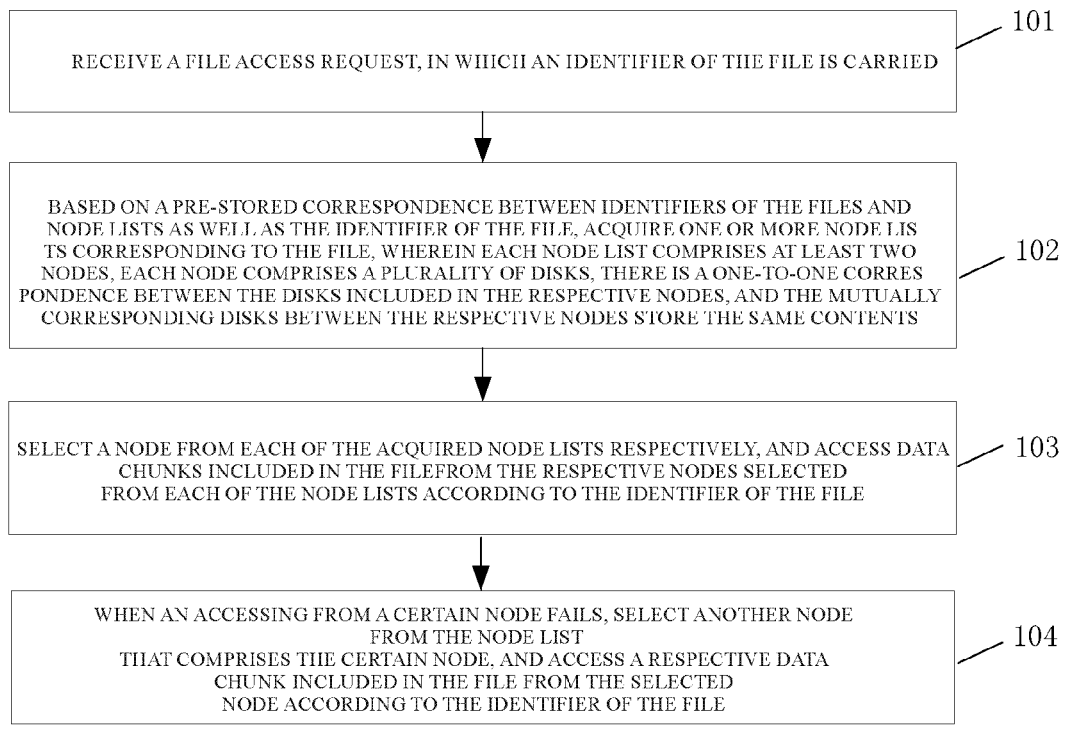
FIG. 1 is a flow diagram showing a disk fault tolerance method according to the first embodiment of the invention.

Referring to FIG. 1, an embodiment of the present invention provides a disk fault tolerance method, which comprises:

101: receiving a file access request, the file access request carrying an identifier of a file;

102: according to a pre-stored correspondence between a file identifier and a node list as well as the identifier of the file, acquiring one or more node lists corresponding to the file, wherein each node list comprises at least two nodes and each node comprises a plurality of disks; there is a one-to-one correspondence between the disks included in respective node in a single node list, and the same content is stored in each of the mutually corresponding disks between each respective node;

103: selecting a node from each of the acquired node lists respectively, and accessing data chunks included in the file from the node selected from each of the node lists according to the identifier of the file;

104: when the access from a certain node fails, selecting another node from the node list that comprises the certain node, and accessing the data chunks included in the file from the selected another node according to the identifier of the file.

This embodiment of the present invention provides a method, which proposes a pairing storage technology in combination with advantages of the dual machine duplexing mechanism, wherein a plurality of completely independent machines are mutually backed up from a node level to a disk level. This method solves problems of data read-write fault, disk fault, single node fault and the like in a large-scale distributed storage system, ensures data reliability in any circumstance, and improves disk availability and read-write performance.

Second Embodiment

The present invention uses a dual machine duplex mechanism at the system level to protect data security, wherein the dual machine duplex mechanism means that two machines both provide the same external service, each of which functions as a backup of the other and has a balanced load, wherein when one machine breaks down, traffic on this machine can be timely switched to the peer machine.

Figure 2:
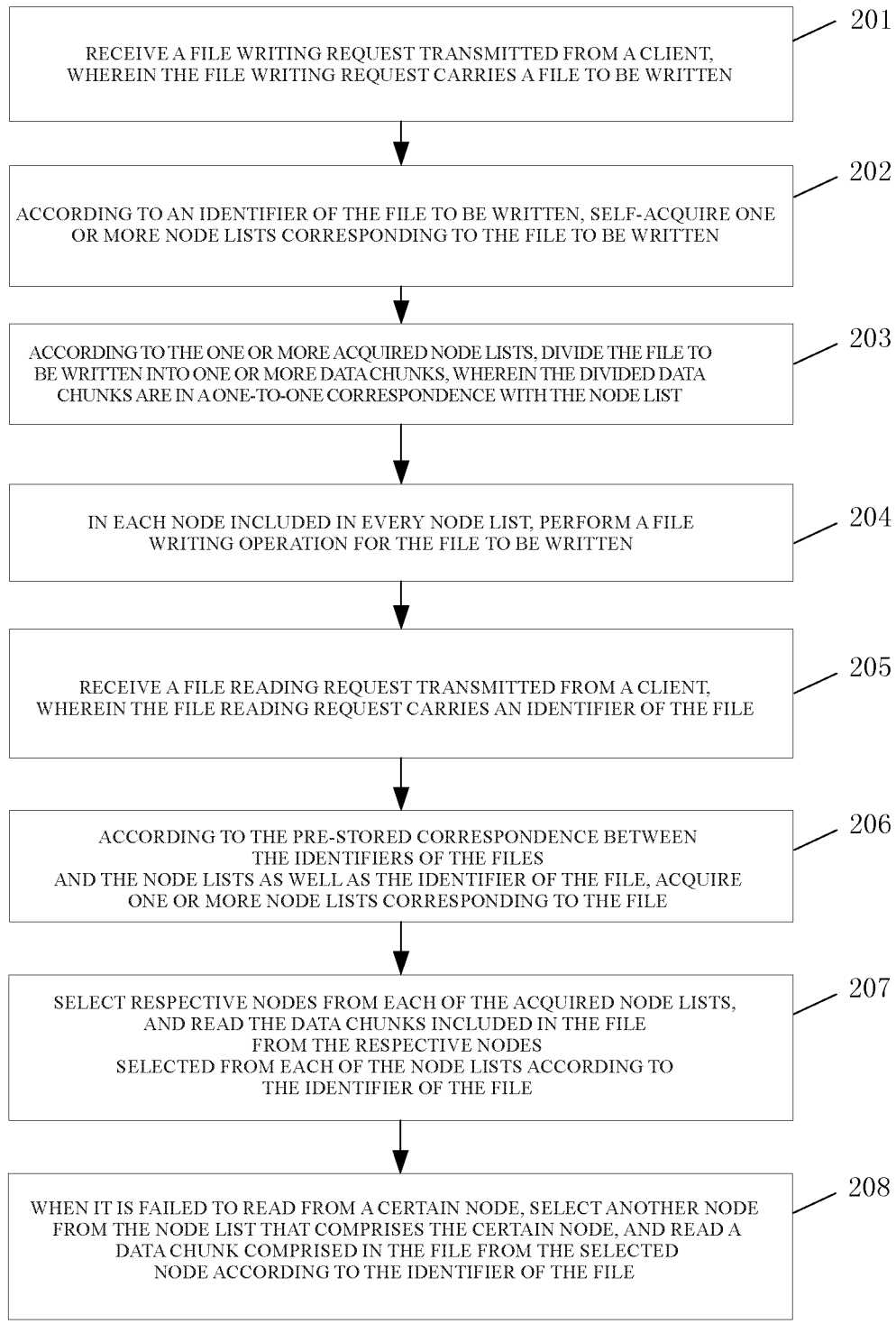
FIG. 2 is a flow diagram showing a disk fault tolerance method according to the second embodiment of the invention.

Referring to FIG. 2, an embodiment of the present invention provides a disk fault tolerance method based on file writing, which comprises:

201: receiving a file writing request transmitted from a client, wherein the file writing request carries a file to be written;

Specifically, this embodiment of the present invention can be applied to a distributed storage system, which may be TFS (Tencent File System, a mass distributed storage system developed by Tencent).

Figure 3:
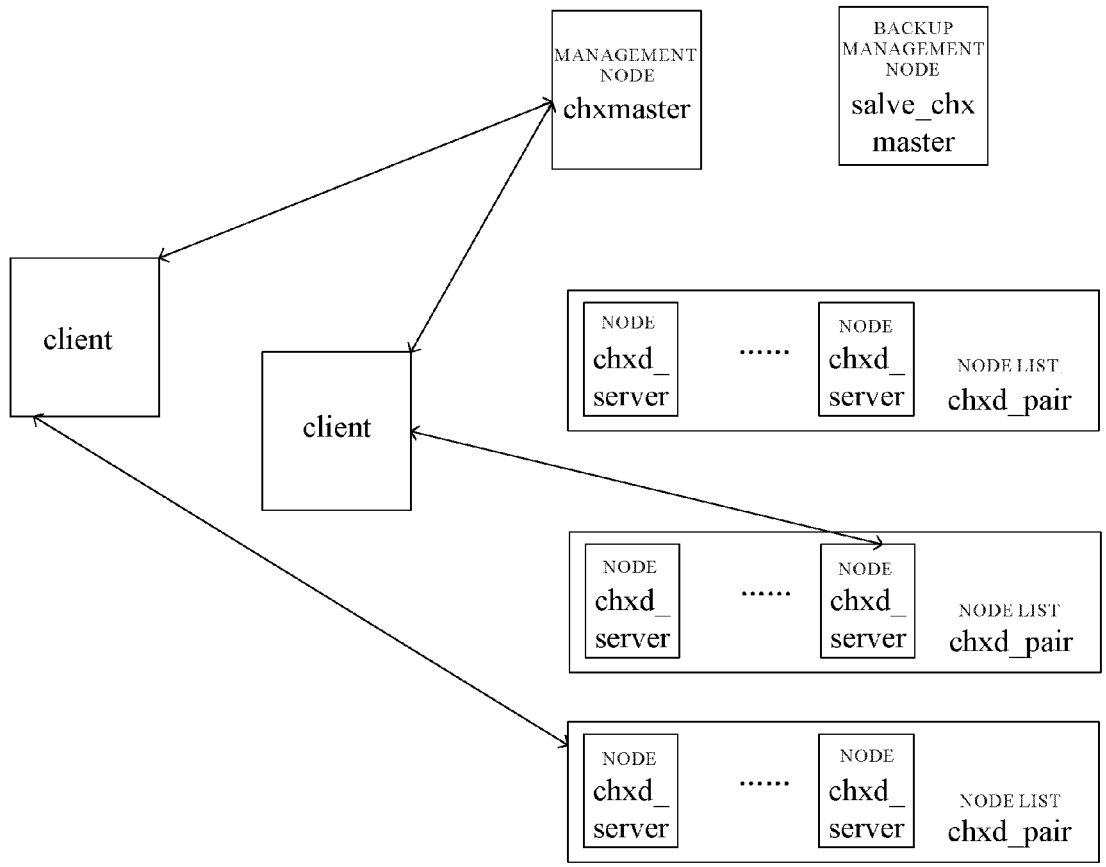
FIG. 3 is a schematic diagram showing a node structure of pairing storage according to the second embodiment of the invention.

The entity to implement the embodiment is a management node chxmaster, as shown in FIG. 3. In the embodiment of the present invention, the management node chxmaster comprises a plurality of chxd_pairs, each of which is a node list, and each node list comprises at least two nodes chxd_server. In the embodiment, a node refers to a storage server. The chxmaster functions to maintain data information stored in every node included in all node lists and store a correspondence between the node list and identifier of the file. The chxd_server is responsible for local storage of the actual data, wherein every node chxd_server included in a single node list stores the same content, and each chxd_server offers service and has a load balancing function.

Furthermore, to ensure reliability of service and eliminate the bottleneck of the management node, the embodiment of the present invention further comprises a backup management node slave_chxmaster configured to achieve file access operations and/or file writing operations in the backup management node when the management node chxmaster malfunctions, wherein the backup management node has the completely same structure with the management node.

Figure 4:
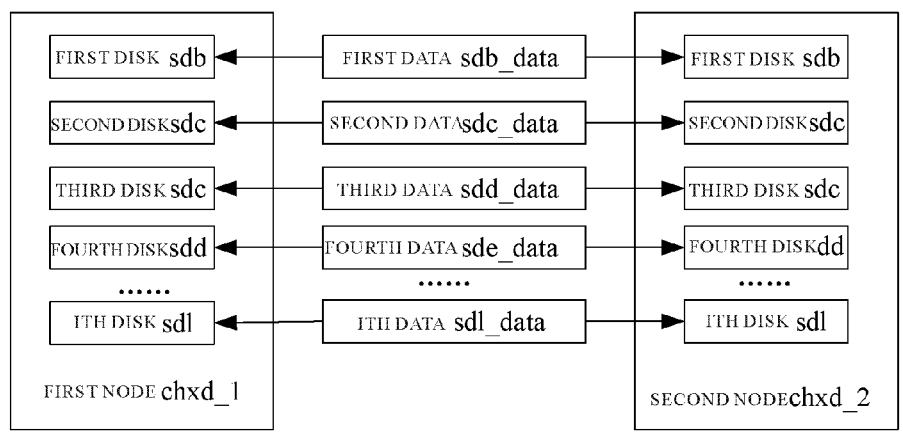
FIG. 4 is a schematic diagram showing a disk structure of pairing storage according to the second embodiment of the invention.

In the embodiment, to ensure that all of the nodes in each node list store the same data, there is a one-to-one correspondence between each of the disks included in the different nodes, and the mutually corresponding disks in different nodes store the same content, which will not cause waste of the disk space. Referring to FIG. 4, a first node chxd_1 comprises several disks: a first disk sdb, a second disk sdc, a third disk sdd, a fourth disk sde, . . . , and an ith disk sdl; and a second node chxd_2 comprises the same number of corresponding disks: sdb, sdc, sdd, sde, . . . , and sdl, wherein the mutually corresponding disks between the first node chxd_1 and the second node chxd_2 store the same content. That is, the logic data of one disk is concurrently stored in the corresponding physical disks of the respective chxd nodes. As an example, the sdl disk of the first node chxd_1 stores the same data with the sdl disk of the second node chxd_2. For example, the sdb disk of the first node chxd_1 stores sdb_data, while the sdb disk of the second node chxd_2 also stores sdb_data. Similarly, the sdc disk, the sdd disk, the sde disk, . . . , and the sdl disk of the chxd_1 node store the same content as the sdc disk, the sdd disk, the sde disk, . . . , and the sdl disk of the chxd_2 node, respectively, for example, a first data sdb_data, a second data sdc_data, a third data sdd_data, a fourth data sdd_data, . . . , and an ith data sdl_data.

In an actual application, a file to be written generally comprises information such as an identifier, a size, a content and a type of the file, and so on.

202: according to an identifier of the file to be written, acquiring one or more node lists corresponding to the file to be written;

In this step, a correspondence between identifiers of the files and the node lists is previously stored in the management node. After receiving the file writing request transmitted from the client, the management node can, based on attribute information such as size and type of the file, assign a storage location for the file to be written in real time (that is, assign one or more node lists for the file to be written), and acquire the one or more node lists corresponding to the file to be written, so as to write the file to be written into disks of the nodes included in the one or more node lists. After assigning the one or more node lists for the file to be written, the management node stores the correspondence between the identifier of the file and the node lists.

203: according to the one or more acquired node lists, dividing the file to be written into one or more data chunks, wherein the divided data chunks are in a one-to-one correspondence with the node lists;

In an actual application, the management node acquires one or more node lists, and divides the file to be written into one or more data chunks when the file to be written needs to be written into the one or more node lists, wherein the divided data chunk(s) are in a one-to-one correspondence with the acquired node list(s) (that is, the number of the divided data chunks is identical with the number of the acquired node lists); and writes the one or more data chunks divided from the file to be written into the corresponding node lists, respectively. For example, when acquiring N node lists according to the file to be written: a first node list, a second node list, . . . , and a Nth node list, the management node divides the file to be written into N data chunks according to the acquired N node lists: a first data chunk, a second data chunk, . . . , and a Nth data chunk, so as to write the N data chunks divided from the file to be written into the corresponding N node lists respectively, i.e., writing the first data chunk into the first node list, the second data chunk into the second node list, . . . , and the Nth data chunk into the Nth node list.

204: in each node included in every node list, performing a file writing operation for the file to be written;

Specifically, each node in a single node list comprises a plurality of disks, each of which corresponds to a disk identifier. The embodiment of the present invention can pre-store a correspondence between the identifiers of the files and the disk identifiers in a node, or alternatively when assigning the node lists for a file to be written, the management node can store a correspondence between the identifiers of the files and the node lists in the management node after assigning a disk identifier for storing file in each node included in every node list with respect to each assigned node list.

In each node included in every node list, a writing operation is performed for the file to be written. Specifically, in each node included in every node list, an identifier of disk for storing a data chunk included in the file to be written is determined, and the data chunk included in the file to be written is written into the corresponding disk. In the embodiment, the step of determining the disk identifier for storing the data chunk included in the file to be written may comprise acquiring a disk identifier corresponding to the file to be written according to the pre-stored correspondence between the identifiers of the files and the disk identifiers in the node; or alternatively, the management node can assign a disk identifier for the file to be written and acquire the disk identifier corresponding to the file to be written, thereby storing the file to be written into the disk corresponding to the disk identifier.

In the embodiment, since each node chxd_server included in a node list chxd_pair provides service and has a load balancing function and all of the nodes in the node list are in a peer-to-peer relation, when the file to be written is written, a writing operation is performed on every node in the one or more node lists corresponding to the file to be written. For example, a first node list comprises m nodes: chxd_server1, chxd_server2, . . . , and chxd_serverm; and when a first data chunk of a file to be written is written into the node chxd_server1 in the first node list, the writing operation can be concurrently updated in chxd_server2, . . . , and chxd_serverm. That is to say, the first data chunk of the file to be written is concurrently written into other nodes (chxd_server2, . . . , and chxd_serverm) in the first node list. Since operations of different nodes are independent, the writing operation does not affect the system efficiency.

In an actual application, one or more node lists corresponding to the file to be written is acquired from the management node, the file to be written is divided into one or more data chunks, and each data chunk is written into the nodes in one node list. For example, N node lists are acquired, each node list comprises m nodes, and the file to be written is divided into N data chunks. When the file to be written is written, according to the identifiers of the disks of the nodes in the acquired first node list, a first data chunk of the file to be written is written into disks of the m nodes in the first node list, and a second data chunk of the file to be written is written into disks of the m nodes in the second node list. That is to say, the writing operations of different data chunks of the file to be written are concurrently performed on the nodes in different node lists, and the writing operation of the same data chunk of the file to be written are concurrently performed on all of the nodes of the identical node list, thereby one of the data chunks is written into all of the nodes of one respective node list.

Furthermore, in the embodiment, after the disk identifiers for storing the data chunks included in the file to be written are determined, according to the identifier of the file to be written and the identifiers of the disks for storing the data chunks included in the file to be written, a correspondence between the identifier of the file and the disk identifiers is generated, and the correspondence between the identifier of the file to be written and the disk identifiers is stored in the management node. Since the management node has pre-stored the correspondence between the identifier of the file and the node lists, the management node now has stored a correspondence of the identifier of the file, the node lists and the disk identifiers.

205: receiving a file reading request transmitted from a client, wherein the file reading request carries an identifier of the file;

The identifier of the file carried in the file access request may specifically refer to the file name, the file attribute and so on, and this is not limited in the present invention.

206: according to the pre-stored correspondence between the identifier of the file and the node lists as well as the identifier of the file, acquiring one or more node lists corresponding to the file;

When the client initiates a file reading request, the chx-master acquires, according to the identifier of the file, one or more node lists corresponding to the file from the pre-stored correspondence between the file identifier and the node lists, wherein each node list comprises at least two nodes, each node comprises a plurality of disks, and there is a one-to-one correspondence between the disks included in each of the nodes in a single node list, and the mutually corresponding disks between the respective node store the same content. In the correspondence between the identifier of the file and the node lists pre-stored in the management node, the node list information comprises ip, port, devid, fid and so on, and which nodes the file is stored in can be obtained from the node list information. Specifically, ip refers to an ip address of node, which is used for identifying a chxd_server node for storing data; port refers to a specific service process of node, which is used for identifying the specific service process in the node for providing a data access; devid is used for identifying a data chunk location in which a file resides; and fid is used for identifying a time storing interval in which a file resides. A specific chxd_server can be determined based on ip and port, and a specific storage location of a file can be determined based on devid and fid.

207: selecting respective nodes from each of the acquired node lists, and reading the data chunks included in the file from the respective nodes selected from each of the node lists according to the identifier of the file;

In this step, when the one or more node lists corresponding to the file have been acquired, the data chunks included in the file are read into respective nodes selected from each of the node lists. From each of the plurality of node lists corresponding to the file, a respective node is selected to read the respective data chunk included in the file, and any node of the node list can be accessed. The embodiment does not limit which specific node of the node list to be accessed.

The step of reading the data chunks included in the file from the respective nodes selected from each of the node lists according to the identifier of the file specifically comprises the step as follows.

Since the management node has stored the correspondence between the disk identifiers and the identifier of the file corresponding to the node lists, the identifiers of disks for storing the file may be acquired from this correspondence based on the identifier of the file, and thereby the data chunks included in the file are read from the respective nodes selected from the node lists according to the identifier of the file and the identifiers of disks for storing the file.

208: when the read from a certain node fails, selecting another node from the node list that comprises the certain node, and reading the data chunk included in the file from the selected node according to the identifier of the file.

In the embodiment, all of the nodes in each node list store identical data, each node is comprised of the same number of disks, and each disk has the same size. Logic data of one disk are concurrently stored in the corresponding physical disks of the respective node chxd_server. In this way, when the read from any machine fails, another node is selected from the node list that comprises the failed node for further reading, and the data chunk included in the file is now read from the selected node according to the identifier of the file. For example, in FIG. 4, data in the sdl disk of the chxd_1 node is identical with data in the sdl disk of the chxd_2 node, and when reading of sdl_data from the sdl disk of the chxd_1 node fails, the sdl disk of the chxd_2 node is selected to continue the reading of sdl_data.

In an actual application, if a disk of any machine is offline, the operation & maintenance personnel will receive an alarm, and another machine chxd_server in the node list_chxd pair which comprises the offline machine can take over this service, and the data can be timely migrated to another node list in order to ensure high data reliability and avoid data loss.

The embodiment of the present invention solves a problem that data in a business tier cannot be normally accessed due to a disk level failure. When an accessing from a node in a node list fails, this file access request will be transmitted to a corresponding disk of another node in this node list, and the another node will perform the file accessing operation. This achieves a technical effect that when a disk of a certain node malfunctions, access to data in a business tier will not be affected.

The embodiment of the present invention provides a concurrent accessing operation, by which a reading request for data of an identical file can be concurrently processed on disks of different nodes, wherein while a node of a node list is selected and accessed, a node in another node list can be simultaneously selected and accessed. Since operations of different nodes are independent, it does not affect the system efficiency.

The embodiment of the present invention provides a method, which proposes a pairing storage technology in combination with advantages of the dual computer duplexing mechanism, wherein a plurality of completely independent machines are mutually backed up from a node level to a disk level. This solves problems of data read-write fault, a disk fault, single node fault and the like in a large-scale distributed storage system, ensures a data reliability in any scene, and improves a disk availability and read-write performance. Also, the method provides external service by mutually backed up machines, which improves data read-write throughput and data service efficiency.

Third Embodiment

In addition to the above data redundancy in a disk level, the present invention can further refine granularity and achieve a data redundancy in a data chunk level. Currently, a large-scale distributed system based on TFS is comprised of tens of thousands of machines, wherein each machine comprises approximately 11 disks, and each disk has a size of approximately 750 GB to 2 TB. Massive data render data read-write anomaly a frequently occurrence. If a data read-write anomaly occurs, data are migrated in unit of disk. This will severely affect the system service efficiency, and on the other hand will cause a lot of overhead associated with hardware. However, a data redundancy in a data chunk level can solve the above problems.

Figure 5:
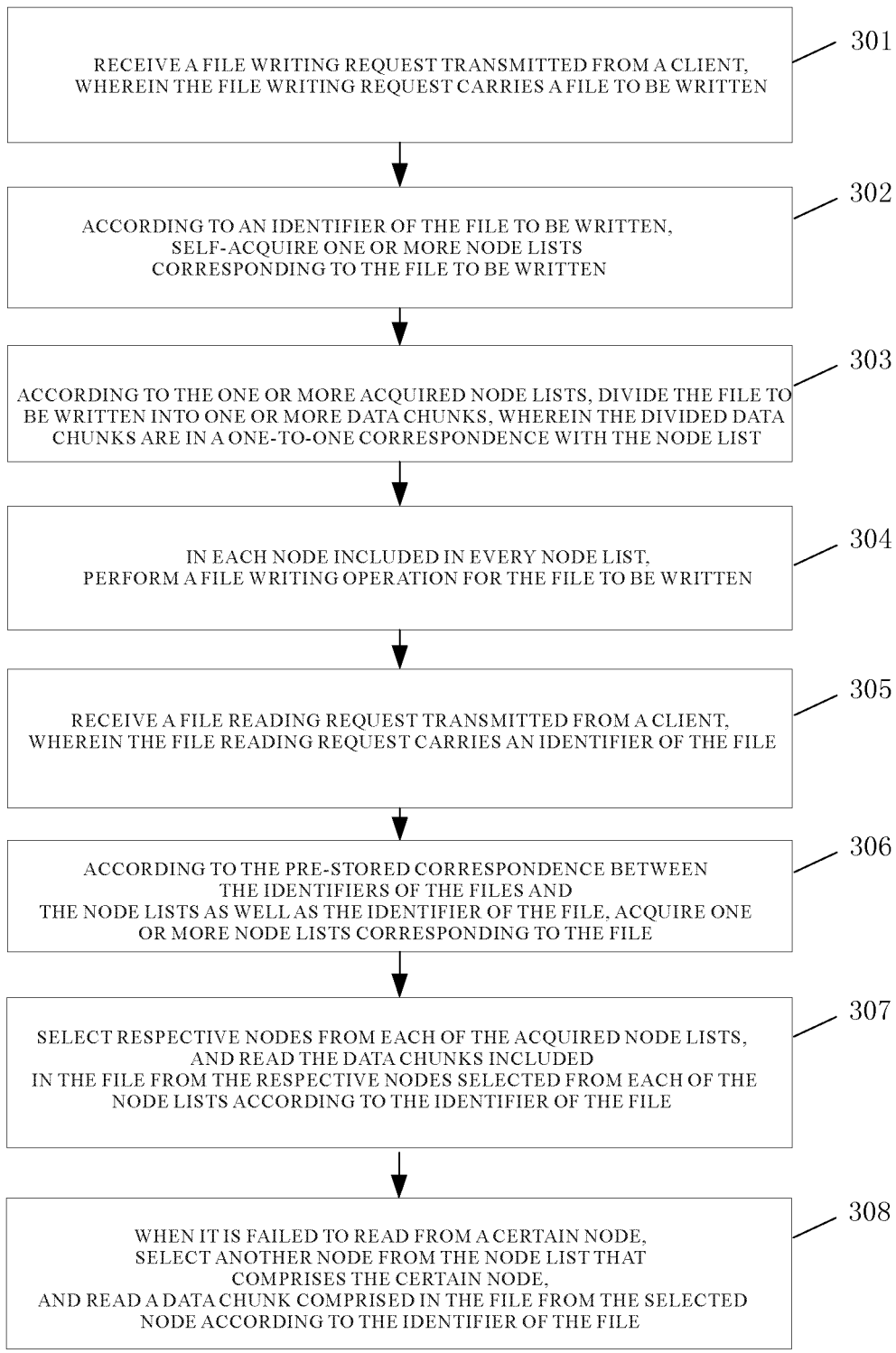
FIG. 5 is a flow diagram showing a disk fault tolerance method according to the third embodiment of the invention.

Referring to FIG. 5, an embodiment of the present invention provides a disk fault tolerance method, which comprises:

301: receiving a file writing request transmitted from a client, wherein the file writing request carries a file to be written;

Specifically, the embodiment of the present invention can be applied to a distributed storage system, which may be TFS (Tencent File System, a mass distributed storage system developed by Tencent).

In general, a file to be written comprises information such as an identifier, a size, a content and a type of the file and so on. This step is identical with the step 201 in the above second embodiment, and no elaboration is needed here.

302: according to an identifier of the file to be written, acquiring one or more node lists corresponding to the file to be written;

For this step, the management node has pre-stored the correspondence between the identifiers of the files and the node lists. After receiving the file writing request transmitted from the client, based on attribute information such as the size and the type of the file, the management node can assign a storage location for the file to be written in real time (i.e., assign one or more node lists for the file to be written), and acquire the one or more node lists corresponding to the file to be written, so as to write the file to be written into disks of nodes included in the one or more lists. After assigning the one or more node lists for the file to be written, the management node stores the correspondence between the identifier of the file and the node lists.

303: according to the one or more acquired node lists, dividing the file to be written into one or more data chunks, wherein the divided data chunk(s) are in a one-to-one correspondence with the node list(s);

In an actual application, the management node acquires the one or more node lists; divides the file to be written into one or more data chunks when the file to be written needs to be written into the one or more node lists, wherein the divided data chunks are in a one-to-one correspondence with the acquired node lists (that is, the number of the divided data chunks is identical with the number of the acquired node lists); and writes the one or more data chunks divided from the file to be written into the corresponding node lists, respectively. For example, when acquiring N node lists according to the file to be written: a first node list, a second node list, . . . , and a Nth node list, the management node divides the file to be written into N data chunks according to the acquired N node lists: a first data chunk, a second data chunk, . . . , and a Nth data chunk, so as to write the N data chunks divided from the file to be written into the corresponding N node lists respectively, i.e., writing the first data chunk into the first node list, the second data chunk into the second node list, . . . , and the Nth data chunk into the Nth node list.

Figure 6:
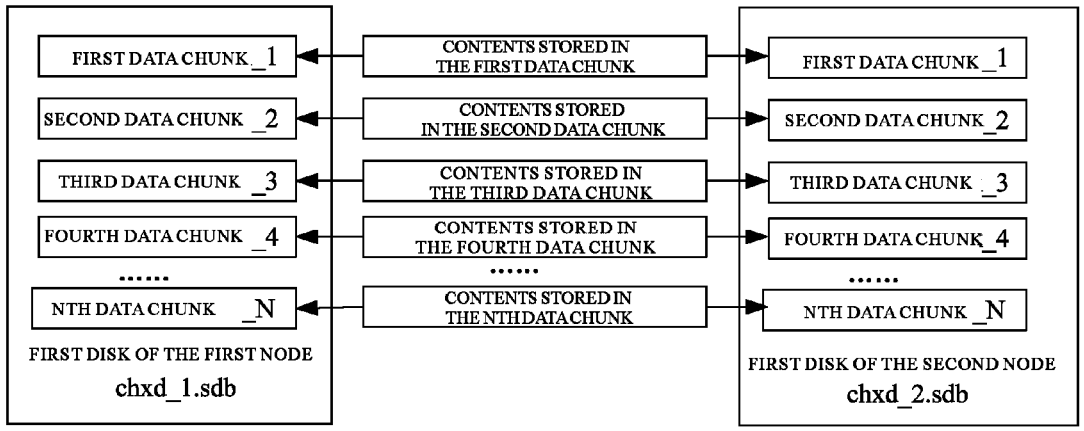
FIG. 6 is a schematic diagram showing a data chunk structure of pairing storage according to the third embodiment of the invention.

304: performing a file writing operation for the file to be written in each node included in every node list;

In the embodiment, to ensure that all of the nodes in each node list store the same data, there is a one-to-one correspondence between the disks included in the respective nodes, the mutually corresponding disks between the respective nodes store the same content, the mutually corresponding disks between the respective nodes store the same data chunk, and the same data chunk included in the mutually corresponding disks between the respective nodes have the same offset, which will not cause waste of disk space. Referring to FIG. 6, FIG. 6 shows a structure in which data chunk information is stored in peer disks of pairing nodes, wherein each of a first node chxd_1 and a second node chxd_2 functions as a backup of the other. It is assumed that a sdb disk has a size of 750 GB and actually stores data of 668 GB. The 668 GB data may be divided into 334 units, wherein each unit is referred to as a data chunk and has a size of 2 GB. Specifically, a first data chunk chunk_1, a second data chunk chunk_2, . . . , and a Nth data chunk chunk_N in a first disk chxd_1.sdb of a first node store the identical content with a first data chunk chunk_1, a second data chunk chunk_2, . . . , and a Nth data chunk chunk_N in a first disk chxd_2.sdb of a second node, respectively, and each data chunk has a same offset in the disks.

Specifically, each node in a node list comprises a plurality of disks, each of which corresponds to a disk identifier. The embodiment of the present invention can pre-store a correspondence of the identifiers of the files, the disk identifiers and the offsets of the data chunks in a node, or alternatively the management node, when assigning the node lists for a file to be written, can store a correspondence of the identifiers of the files, the node lists and the offsets of the data chunks in the management node after assigning a disk identifier for storing file in each node included in every node list with respect to each assigned node list.

In each node included in every node list, a writing operation is performed for the file to be written. Specifically, in each node included in every node list, the writing operation determines identifiers of disks for storing the data chunks included in the file to be written; determines an offset in the disk for storing the data chunks included in the file according to the identifier of disk for storing the data chunks included in the file; and stores the data chunks included in the file into data chucks of the disk corresponding to the disk identifier, according to the offset for storing the data chunks included in the file. In the embodiment, the step of determining the offset in the disk for storing the data chunks included in the file may comprise: by the correspondence of the identifiers of the files, the disk identifiers and the offsets of the data chunks pre-stored in the management node, acquiring an offset for storing the data chunks included in the file; or alternatively, the management node can assign a disk identifier for the file to be written and an offset for storing the data chunks included in the file, and acquire the offset for storing the data chunks included in the file. Thereby the data chunks included in the file to be written are stored into data chucks of the disk corresponding to the disk identifier.

In the embodiment, since each node chxd_server included in the node list chxd_pair provides service and has a load balancing function, all of the nodes in a node list are in a peer-to-peer relation; and when the file to be written is written, a writing operation is performed on each respective node in one or more node lists corresponding to the file to be written. For example, a first node list comprises m nodes: chxd_server1, chxd_server2, . . . , and chxd_serverm; and when a first data chunk of a file to be written is written into the node chxd_server1 in the first node list, the writing operation can be concurrently updated in chxd_server2, . . . , and chxd_serverm. That is to say, the first data chunk of the file to be written is concurrently wrote into other nodes (chxd_server2, . . . , and chxd_serverm) in the first node list. Since operations of different nodes are independent, it does not affect the system efficiency.

In an actual application, one or more node lists corresponding to a file to be written are acquired from the management node, the file to be written is divided into one or more data chunks, and each data chunk is written into the nodes in one node list. For example, N node lists are acquired, each node list comprises m nodes, and a file to be written is divided into N data chunks. When the file to be written is written, according to identifiers of the disks of the nodes in the acquired first node list, a first data chunk of the file to be written is written into data chunks of the disks of the m nodes in the first node list, and a second data chunk of the file to be written is written into data chunks of the disks of the m nodes in the second node list. That is to say, the writing operations of different data chunks of the file to be written are concurrently performed on nodes in different node lists, and the writing operation of the same data chunk of the file to be written are concurrently performed on all of the nodes of a single node list, thereby one of the data chunks is written into all of the nodes of one respective node list.

Furthermore, in the embodiment, after the disk identifiers for storing the data chunks included in the file to be written are determined, according to the identifier of the file to be written, identifiers of the disks for storing the data chunks included in the file and offsets for storing the data chunks included in the file, a correspondence of the identifier of the file, the disk identifiers and the offsets of the data chunks is generated, and the correspondence of the identifier of the file, the disk identifiers and the offsets of the data chunks is stored in the management node. Since the management node has pre-stored the correspondence between the identifier of the file and the node lists, the management node now has stored a correspondence of the identifier of the file, the node lists, the disk identifiers and the offsets of the data chunks.

305: receiving a file reading request transmitted from the client, wherein the file reading request carries an identifier of the file;

The identifier of the file carried in the file access request specifically refers to file name, file attribute and so on, and this is not limited in the present invention.

306: according to the pre-stored correspondence between the identifiers of the files and the node lists as well as the identifier of the file, acquiring one or more node lists corresponding to the file;

When a client initiates a file reading request, the chxmaster acquires, according to the identifier of the file, one or more node lists corresponding to the file from the pre-stored correspondence between the identifiers of files and the node lists, wherein each node list comprises at least two nodes, each node comprises a plurality of disks, there is a one-to-one correspondence between the disks included in the respective nodes, the mutually corresponding disks between the respective nodes store the same data chunks, the same data chunks included in the mutually corresponding disks between the respective nodes have the same offset, and the corresponding data chunks in the mutually corresponding disks between the respective nodes store the same content. In the correspondence between the identifiers of files and the node lists pre-stored in the management node, the node list information comprises ip, port, devid, fid and so on, and which nodes the file is stored in can be obtained from the node list information. Specifically, ip refers to an ip address of node, which is used for identifying a chxd_server node for storing data; port refers to a specific service process of node, which is used for identifying the specific service process in the node for providing a data access; devid is used for identifying a data chunk location in which a file resides; and fid is used for identifying a time storing interval in which a file resides. A specific chxd_server can be determined based on ip and port, and a specifc storage location of a file can be determined based on devid and fid.

307: selecting a respective node from each of the acquired node lists, and reading the data chunks included in the file from the respective node selected from each of the node lists according to the identifier of the file;

In this step, when the one or more node lists corresponding to the file have been acquired, the data chunks included in the file are read from respective nodes selected from each of the node lists. From each of the one or more node lists corresponding to the file, a respective node is selected from which the respective data chunk included in the file is read, and any node of the node list can be accessed. The embodiment does not limit which specific node of the node list is accessed.

The step of reading the data chunks included in the file from the respective nodes selected from each of the node lists according to the identifier of the file specifically comprises the step as follows.

Since the management node has stored the correspondence of the identifiers of the files corresponding to the node lists, the disk identifiers and the offsets of the data chunks, the identifiers of disks for storing the file and the offsets for storing the data chunks included in the file in the disk are acquired from this correspondence base on the identifier of the file, and thereby data chunks included in the file is read from the respective nodes selected from the node lists according to the identifiers of disks for storing the file and the offsets for storing the data chunks included in the file in the disk.

308: when the reading from a certain node fails, selecting another node from the node list that comprises the certain node, and reading a data chunk comprised in the file from the selected node according to the identifier of the file.

In the embodiment, all of the nodes chxd_server in each node list chxd_pair store the same data, each node chxd_server is comprised of a same number of disks, and each disk has a same size. Data of one disk in terms of logic are concurrently stored in the corresponding physical disks of the respective nodes chxd_server. In this way, when the reading from any machine fails, from the node list that comprises the node, another node is selected for further reading, and a data chunk comprised in the file is now read from the selected node according to the identifier of the file. For example, data in the sdl disk of the chxd_1 node are identical with data in the sdl disk of the chxd_2 node are identical, and when a reading of sdl_data from a first data chunk of the sdl disk of the chxd_1 node fails, a first data chunk of the sdl disk of the chxd_2 node is selected from which the sdl_data is further reading.

In an actual application, if a data read-write anomaly occurs on a first data chunk of sdb disk of chxd_1 node, a first data chunk of sdb disk of chxd_2 node is used as a source for data migrating, and other data chunks of the sdb disk of the chxd_2 node need not be moved. This can substantially reduce an additional system overload due to data migration, and thus reduce costs.

The embodiment of the present invention solves a problem that data in a business tier cannot be normally accessed due to a data chunk failure. When an accessing from a data chunk of a node in a node list fails, this file access request will be transmitted to a corresponding data chunk of a corresponding disk of another node in this node list, and the another node will perform the file accessing operation. This achieves a technical effect that when a disk of a certain data chunk malfunctions, access to data in a business tier will not be affected.

The embodiment of the present invention provides a concurrent accessing operation, by which a reading request for data of an identical file can be concurrently processed on data chunks of different disks, wherein while a data chunk of a disk of a node in a node list is selected and accessed, a node in another node list can be simultaneously selected, and a data chunk of a disk of the another node can be concurrently accessed. Since operations of different nodes are independent, it does not affect the system efficiency.

The embodiment of the present invention provides a method, which proposes a pairing storage technology in combination with advantages of the dual machine duplexing mechanism, wherein a plurality of completely independent machines are mutually backed up from a node level to a disk level. This solves problems of data read-write fault, a disk fault, single node fault and the like in a large-scale distributed storage system, ensures a data reliability in any scene, and improves a disk availability and read-write performance. Also, the method provides external service by mutually backed up machines, which improves data read-write throughput and data service efficiency.

Fourth Embodiment

Figure 7:
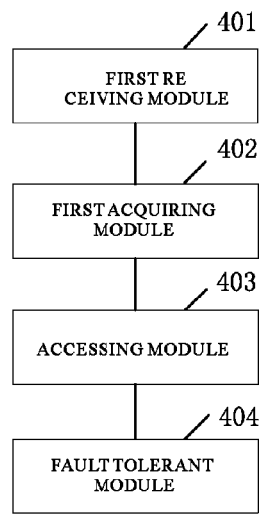
FIG. 7 is a schematic diagram of a structure of a disk fault tolerance device according to the fourth embodiment of the present invention.

Referring to FIG. 7, an embodiment of the present invention provides a disk fault tolerance device, which includes:

a first receiving module 401, configured to receive a file access request, in which an identifier of the file is carried;

a first acquiring module 402, configured to acquire one or more node lists corresponding to the file, according to a pre-stored correspondence between identifiers of the files and node lists as well as the identifier of the file, wherein each node list comprises a plurality of nodes, each node comprises a plurality of disks, there is a one-to-one correspondence between the disks included in the respective nodes, and the mutually corresponding disks between the respective nodes store the same contents;

an accessing module 403, configured to select respective nodes from each of the acquired node lists, and accessing data chunks included in the file from the respective nodes selected from each of the node lists according to the identifier of the file;

a fault tolerance module 404, configured to select another node from the node list that comprises a certain node, and access a respective data chunk included in the file from the selected node according to the identifier of the file, when an accessing from the certain node fails.

Specifically, the accessing module 403 comprises a selecting unit and an accessing unit, wherein:

the selecting unit is configured for selecting the respective nodes from each of the acquired node lists; and the accessing unit further comprises:

a first acquiring subunit, for acquiring a correspondence between the disk identifiers and the identifiers of the files corresponding to the node lists;

a second acquiring subunit, for acquiring identifiers of disks for storing the file from the correspondence between the disk identifiers and the identifiers of the files corresponding to the node lists, according to the identifier of the file; and an accessing subunit, for accessing data chunks included in the file from the respective nodes selected by the selecting unit according to the identifier of the file and the disk identifiers for storing the file.

Specifically, the mutually corresponding disks between the respective nodes store the same data chunks, and the same data chunks included in the mutually corresponding disks between the respective nodes have a same offset; and accordingly, the accessing module may also comprise a selecting unit and an accessing unit.

The selecting unit is configured for selecting the respective nodes from each of the acquired node lists; and the accessing unit comprises:

a first acquiring subunit, for acquiring a correspondence of the identifiers of the files corresponding to the node lists, disk identifiers and the offsets of the data chunks;

a second acquiring subunit, for, according to the identifier of the file, acquiring identifiers of disks for storing the file and the offsets for storing the data chunks included in the file in the disk from the correspondence of the identifiers of the files corresponding to the node lists, the disk identifiers and the offsets of the data chunks; and an accessing subunit, for, according to the identifiers of disks for storing the file and the offsets for storing the data chunks included in the file in the disk, accessing data chunks included in the file from the respective nodes selected by the selecting unit.

Figure 8:
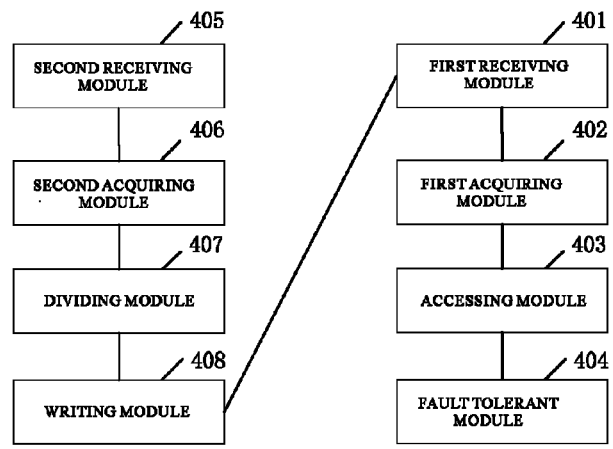
FIG. 8 is a schematic diagram of another structure of a disk fault tolerance device according to the fourth embodiment of the present invention.

Further, referring to FIG. 8, the device also comprises:

a second receiving module 405, for receiving a file writing request, in which a file to be written is carried;

a second acquiring module 406, for, according to an identifier of the file to be written, acquiring one or more node lists corresponding to the file to be written from the stored correspondence between the identifiers of the files and the node lists;

a dividing module 407, for, according to the one or more acquired node lists, dividing the file to be written into one or more data chunks, wherein the divided data chunks are in a one-to-one correspondence with the node lists;

a writing module 408, for, in each node included in every node list, determining an identifier of disk for storing the data chunks included in the file, and writing the data chunks included in the file into a disk corresponding to the disk identifier.

Furthermore, the device also may comprise a storage module being configured to: according to the identifier of the file to be written and identifiers of the disks for storing the data chunks included in the file, generate a correspondence between the identifiers of the files and the disk identifiers; and storing the correspondence between the identifiers of the files and the disk identifiers.

Specifically, the writing module 408 comprises:

a determining unit, for, in each node included in every node list, determining the identifier of disk for storing the data chunks included in the file, and determining an offset in the disk for storing the data chunks included in the file, according to the identifier of disk for storing the data chunks included in the file; and a writing unit, for storing the data chunks included in the file into data chucks of the disk corresponding to the disk identifier, according to the offset for storing the data chunks included in the file.

Further, the device may also comprise a storage module for, according to an identifier of the file to be written, identifiers of disks for storing the data chunks included in the file and offsets for storing the data chunks included in the file, generating a correspondence of the identifier of the file, the disk identifiers and the offsets of the data chunks; and storing the correspondence of the identifier of the file, the disk identifiers and the offsets of the data chunks.

The embodiment of the present invention provides a device, which proposes a pairing storage technology in combination with advantages of the dual machine duplexing mechanism, wherein a plurality of completely independent machines are mutually backed up from a node level to a disk level. This solves problems of data read-write fault, a disk fault, single node fault and the like in a large-scale distributed storage system, ensures a data reliability in any scene, and improves a disk availability and read-write performance. Also, the method provides external service by mutually backed up machines, which improves data read-write throughput and data service efficiency.

It should be noted that: in a disk tolerance by the disk fault tolerance device provided in the above embodiment, the above division of the various functional modules should only be considered as an example. In an actual application, these functions can be assigned to different modules as required. That is to say, the internal structure of the device can be divided into a different group of functional modules so as to perform all or part of the functions described above. Moreover, the disk fault tolerance device provided in the above embodiment has the same concept with the embodiments of the disk fault tolerance method, and its specific implementing process can be seen from the method embodiments and needs no elaboration here.

The serial numbers of the above embodiments of the present invention are only used for the purpose of description, and are not intended to represent any hierarchy.

Fifth Embodiment

Figure 9:
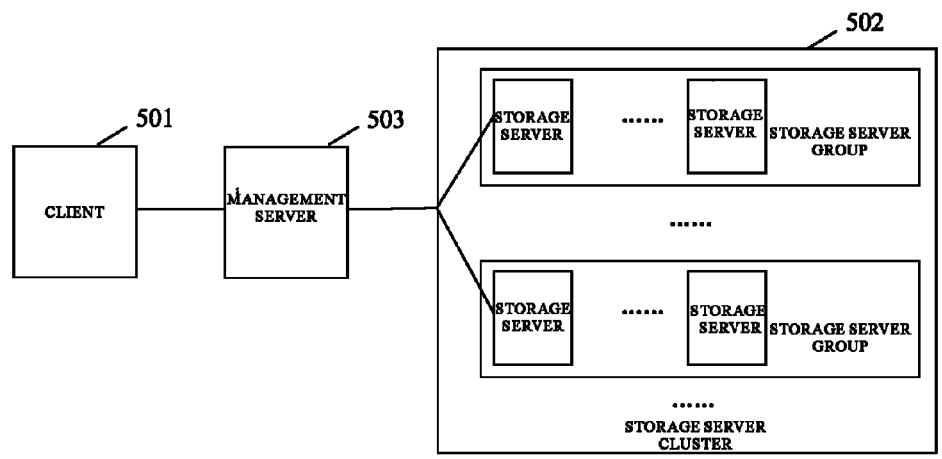
FIG. 9 is a schematic diagram of a structure of a disk fault tolerance system according to the fifth embodiment of the present invention.

Referring to FIG. 9, an embodiment of the present invention provides a disk fault tolerance system, which comprises a client 501, a storage server cluster 502 and a management server 503.

The client 501 is configured for sending a file access request to the management server 503, wherein an identifier of the file is carried in the file access request.

The storage server cluster 502 comprises a plurality of storage server groups, wherein each storage server group comprises at least two storage servers, each storage server comprises a plurality of disks, there is a one-to-one correspondence between the disks included in the respective storage servers, and the mutually corresponding disks between the respective storage servers store the same contents.

The management server 503 is configured for receiving the file access request sent from the client 501, acquiring one or more storage server groups corresponding to the file according to a pre-stored correspondence between identifiers of the files and the storage server groups included in the storage server cluster 502 as well as the identifier of the file; selecting respective storage servers from each of the acquired storage server groups, and accessing data chunks included in the file from the respective storage servers selected from each of the storage server groups according to the identifier of the file; and when an accessing from a certain storage server fails, selecting another storage server from the storage server group that comprises the certain storage server, and accessing a respective data chunk included in the file from the selected storage server according to the identifier of the file.

Specifically, the management server in this embodiment refers to the management node in the above embodiments.

Further, the management server 503 is also used for acquiring a correspondence between disk identifiers and the identifiers of the files corresponding to the storage server groups; acquiring identifiers of disks for storing the file from the correspondence between the disk identifiers and the identifiers of the files corresponding to the storage server groups, according to the identifier of the file; and accessing data chunks included in the file from the respective storage servers selected from the storage server groups according to the identifier of the file and the disk identifiers for storing the file.

Further, the management server 503 is also used for storing the same data chunks in the mutually corresponding disks between the respective storage servers, wherein the same data chunks included in the mutually corresponding disks between the respective storage servers have a same offset.

Further, the management server 503 is also used for: acquiring a correspondence of the identifiers of the files corresponding to the storage server groups, disk identifiers and the offsets of the data chunks; according to the identifier of the file, acquiring identifiers of disks for storing the file and the offsets for storing the data chunks included in the file in the disk from the correspondence of the identifiers of the files corresponding to the storage server groups, the disk identifiers and the offsets of the data chunks; and accessing data chunks included in the file from the respective storage servers selected from each of the storage server groups, according to the identifiers of disks for storing the file and the offsets for storing the data chunks included in the file in the disk.

Specifically, the client 501 is also used for sending a file writing request to the management server 503, wherein a file to be written is carried in the file writing request.

Accordingly, the management server 503 is also used for: receiving the file writing request sent from the client 501; according to an identifier of the file to be written, acquiring one or more storage server groups corresponding to the file to be written, wherein the management server stores a correspondence between identifiers of the files and the storage server groups; according to the one or more acquired storage server groups, dividing the file to be written into one or more data chunks, wherein the divided data chunks are in a one-to-one correspondence with the storage server groups; and in each storage server included in every storage server group, determining an identifier of disk for storing the data chunks included in the file, and writing the data chunks included in the file into a disk corresponding to the disk identifier.

Further, the management server 503 is also used for: according to the identifier of the file to be written and identifiers of the disks for storing the data chunks included in the file, generating and storing a correspondence between the identifier of the file and the disk identifiers.

Specifically, the management server 503 is also used for: in each storage server included in every storage server group, determining the identifier of disk for storing the data chunks included in the file, and determining an offset in the disk for storing the data chunks included in the file, according to the identifier of disk for storing the data chunks included in the file; and storing the data chunks included in the file into data chucks of the disk corresponding to the disk identifier, according to the offset for storing the data chunks included in the file.

Specifically, the management server 503 is also used for: according to an identifier of the file to be written, identifiers of disks for storing the data chunks included in the file and offsets for storing the data chunks included in the file, generating and storing a correspondence of the identifiers of the files, the disk identifiers and the offsets of the data chunks.

Furthermore, to ensure a reliability of service and eliminate the breakdown bottleneck of the management server, the disk fault tolerance system in the embodiment of the present invention may further comprise a backup management server, for achieving file accessing operations and/or file writing operations through the backup management server when the management server malfunctions. Specifically, the backup management server has an identical structure with the management server.

Specifically, the backup management server is used for: when the management server malfunctions, receiving the file access request sent from the management server, acquiring one or more storage server groups corresponding to the file according to a pre-stored correspondence between identifiers of the files and the storage server groups included in the storage server cluster as well as the identifier of the file, wherein each storage server group comprises a plurality of storage servers, each storage server comprises a plurality of disks, there is a one-to-one correspondence between the disks included in the respective storage servers, and the mutually corresponding disks between the respective storage servers store the same contents; selecting respective storage servers from each of the acquired storage server groups, and accessing data chunks included in the file from the respective storage servers selected from each of the storage server groups according to the identifier of the file; and when an accessing from a certain storage server fails, selecting another storage server from the storage server group that comprises the certain storage server, and accessing a respective data chunk included in the file from the selected storage server according to the identifier of the file.

The embodiment of the present invention provides a system, which proposes a multilevel pairing storage technology in combination with advantages of the dual machine duplexing mechanism, wherein a plurality of completely independent machines are mutually backed up from a storage server level to a disk level to a data chunk level. This solves problems of data read-write fault, a disk fault, single server fault and the like in a large-scale distributed storage system, ensures a data reliability in any scene, and improves a disk availability and read-write performance. Also, the method provides external service by mutually backed up machines, which improves data read-write throughput and data service efficiency.

It can be appreciated by a person skilled in the art that all or part of steps for implementing the above embodiments can be embodied by hardware, and also can be achieved by a program that instructs associated hardware, wherein the program can be stored in a computer readable storage medium, which may be read only memory, disks, optic disks and so on.

The above description only show several preferable embodiments of the present invention, and cannot be interpreted as limitation to the present invention. It should be noted that any modification, equivalent alternation and improvement with the spirit and principle of the present invention shall be encompassed in the scope of protection of the present invention.

What is claimed is:

1. A method, comprising:
    receiving a file access request, in which an identifier of a file is carried, the file comprises a plurality of data chunks, and each of the data chunks is stored in at least two nodes included in a node list;
    according to a pre-stored correspondence between identifiers of files and node lists as well as the identifier of the file, acquiring one or more node lists corresponding to the file, wherein each node list comprises at least two nodes, each node comprises a plurality of disks, there is a one-to-one correspondence between the disks included in the respective nodes in a single node list, and each of the mutually corresponding disks between the respective nodes stores a same divided chunk of a data chunk stored in the respective nodes, and the same divided chunk of the data chunk included in each of the mutually corresponding disks between the respective nodes has a same offset;
    selecting a node from each of the acquired node lists respectively, and accessing data chunks included in the file from respective nodes selected from each of the node lists according to the identifier of the file; and
    when an accessing from a certain node fails, selecting another node from the node list that comprises the certain node, and accessing a respective data chunk included in the file from the selected node according to the identifier of the file.

2. The method according to claim 1, characterized in that, accessing data chunks included in the file from the respective nodes selected from each of the node lists according to the identifier of the file, comprises:
    acquiring a correspondence between disk identifiers and the identifiers of the files corresponding to the node lists;
    acquiring identifiers of disks for storing the file from the correspondence between the disk identifiers and the identifiers of the files corresponding to the node lists, according to the identifier of the file; and
    according to the identifier of the file and the disk identifiers for storing the file, accessing data chunks included in the file from the respective nodes selected from the node lists.

3. The method according to claim 1, characterized in that, accessing data chunks included in the file from the respective nodes selected from each of the node lists according to the identifier of the file, comprises:
    acquiring a correspondence of the identifiers of the files corresponding to the node lists, disk identifiers and offsets of divided chunks;
    according to the identifier of the file, acquiring identifiers of disks for storing the file and the offsets for storing the divided chunks included in the file in the disk from the correspondence of the identifiers of the files corresponding to the node lists, the disk identifiers and the offsets of the divided chunk; and
    according to the identifiers of disks for storing the file and the offsets for storing the divided chunks included in the file in the disk, accessing data chunks included in the file from the respective nodes selected from the node lists.

4. The method according to claim 1, characterized in that, the method further comprises:
    receiving a file writing request, in which a file to be written is carried, wherein the file to be written can include the identifier, size, content, type information of the file;
    according to the identifier of the file to be written, acquiring one or more node lists corresponding to the file to be written from the stored correspondence between the identifiers of the files and the node lists;
    according to the one or more acquired node lists, dividing the file to be written into one or more data chunks, wherein the divided data chunks are in a one-to-one correspondence with the node lists; and
    in each node included in every node list, determining identifiers of the disks for storing divided chunks of each of the data chunks included in the file, and writing the divided chunks into disks corresponding to the disk identifiers.

5. The method according to claim 4, characterized in that after determining identifiers of the disks for storing the data chunks included in the file, the method further comprises steps of:
according to the identifier of the file to be written and identifiers of the disks for storing divided chunks of each of the data chunks included in the file, generating a correspondence between the identifier of the file and the disk identifiers; and
storing the correspondence between the identifier of the file and the disk identifiers.

6. The method according to claim 4, characterized in that, after determining identifiers of the disks for storing the divided chunks of each of the data chunks included in the file, the method further comprises steps of:
according to identifiers of the disks for storing the divided chunks of each of the data chunks included in the file, determining offsets in the disks for storing the divided chunks of each of data chunks included in the file; and
writing the divided chunks of each of the data chunks included in the file into disks corresponding to the disk identifiers, which further comprises:
according to the offsets for storing the divided chunks of each of the data chunks included in the file, storing the divided chunks of each of data chunks included in the file into the disks corresponding to the disk identifiers.

7. The method according to claim 6, characterized in that, after determining an offset in the disk for storing the divided chunks of each of the data chunks included in the file, the method further comprises steps of:
according to the identifier of the file to be written, the identifiers of disks for storing the divided chunks of each of the data chunks included in the file and the offsets for storing the divided chunks of each of the data chunks included in the file, generating a correspondence of the identifier of the file, the disk identifiers and the offsets of the divided chunks; and
storing the correspondence of the identifier of the file, the disk identifiers and the offsets of the divided chunks.

8. A device, comprising:
a receiving module, for receiving a file access request, in which an identifier of a file is carried, the file comprises a plurality of data chunks, and each of the data chunks is stored in at least two nodes included in a node list;
a first acquiring module, configured to acquire one or more node lists corresponding to the file according to a pre-stored correspondence between identifiers of the files and node lists as well as the identifier of the file, wherein each node list comprises at least two nodes, each node comprises a plurality of disks, there is a one-to-one correspondence between the disks included in respective nodes, and each of the mutually corresponding disks between the respective nodes stores a same divided chunk of a data chunk stored in the respective nodes, and the same divided chunk of the data chunk included in each of the mutually corresponding disks between the respective nodes has a same offset;
an accessing module, configured to select a node from each of the acquired node lists respectively, and access data chunks included in the file from the respective nodes selected from each of the node lists according to the identifier of the file; and
a fault tolerance module, configured to select another node from the node list that comprises a certain node, and access a respective data chunk included in the file from the selected node according to the identifier of the file, when an accessing from the certain node fails.

9. The device according to claim 8, characterized in that, the accessing module comprises:
a selecting unit, configured to select the respective nodes from each of the acquired node lists; and
an accessing unit, which comprises:
a first acquiring subunit, configured to acquire a correspondence between disk identifiers and the identifiers of the files corresponding to the node lists;
a second acquiring subunit, configured to acquire identifiers of disks for storing the file from the correspondence between the disk identifiers and the identifiers of the files corresponding to the node lists, according to the identifier of the file; and
an accessing subunit, configured to access data chunks included in the file from the respective nodes selected by the selecting unit, according to the identifier of the file and the disk identifiers for storing the file.

10. The device according to claim 9, characterized in that, the device further comprises:
a receiving module, configured to receive a file writing request, in which a file to be written is carried, wherein the file to be written includes the identifier, size, contents, and type information of the file;
a second acquiring module, configured to acquire one or more node lists corresponding to the file to be written from the stored correspondence between the identifiers of the files and the node lists, according to an identifier of the file to be written;
a dividing module, configured to divide the file to be written into one or more data chunks, according to the one or more acquired node lists, wherein the divided data chunks are in a one-to-one correspondence with the node lists; and
a writing module, configured to determine an identifier of disk for storing divided chunks of each of the data chunks included in the file, and write the divided chunks into a disk corresponding to the disk identifier, in each node included in every node list.

11. The device according to claim 10, characterized in that the device further comprises a storage module, which is configured to generate a correspondence between the identifier of the file and the disk identifiers, and store the correspondence between the identifier of the file and the disk identifiers, according to the identifier of the file to be written and identifiers of the disks for storing the divided chunks of each of the data chunks included in the file.

12. The device according to claim 8, characterized in that, the accessing module comprises:
a selecting unit, configured to select a node from each of the acquired node lists respectively;
an accessing unit, which comprises:
a first acquiring subunit, configured to acquire a correspondence of the identifiers of the files corresponding to the node lists, disk identifiers and offsets of divided chunks;
a second acquiring subunit, configured to acquire identifiers of disks for storing the file and the offsets for storing the divided chunks included in the file in the disk from the correspondence of the identifiers of the files corresponding to the node lists, the disk identifiers and the offsets of the divided chunks, according to the identifier of the file; and
an accessing subunit, configured to access data chunks included in the file from the respective nodes selected by the selecting unit, according to the identifiers of disks for storing the file and the offsets for storing the divided chunks included in the file in the disk.

13. The device according to claim 10, characterized in that, the writing module comprises:
a determining unit, configured to determine identifiers of disks for storing the divided chunks of each of the data chunks included in the file in each node included in every node list, and determine offsets in the disks for storing the divided chunks of each of the data chunks included in the file according to the identifiers of the disks for storing the divided chunks of each of the data chunks included in the file; and
a writing unit, configured to store the divided chunks of each of the data chunks included in the file into disks corresponding to the disk identifiers, according to the offsets for storing the divided chunks of each of the data chunks included in the file.

14. The device according to claim 13, characterized in that, the device further comprises a storage module, the storage module is configured to:
according to an identifier of the file to be written, identifiers of disks for storing the divided chunks of each of the data chunks included in the file and offsets for storing the divided chunks of each of the data chunks included in the file, generate a correspondence of the identifier of the file, the disk identifiers and the offsets of the divided chunks of each of the data chunks; and store the correspondence of the identifier of the file, the disk identifiers and the offsets of the divided chunks.

15. A system, characterized in that the system comprises a client, a storage server cluster and a management server;
the client is configured to send a file access request to the management server, wherein an identifier of a file is carried in the file access request, the file comprises a plurality of data chunks, and each of the data chunks is stored in at least two nodes included in a node list;
the storage server cluster comprises a plurality of storage server groups, wherein each storage server group comprises at least two storage servers, each storage server comprises a plurality of disks, there is a one-to-one correspondence between the disks included in the respective storage servers, and each of the mutually corresponding disks between the respective storage servers stores a same divided chunk of a data chunk stored in the respective storage servers, and the same divided chunk of the data chunk included in each of the mutually corresponding disks between the respective storage servers has a same offset; and
the management server is configured to:
receive the file access request sent from the client;
acquire one or more storage server groups corresponding to the file according to a pre-stored correspondence between identifiers of the files and the storage server groups included in the storage server cluster as well as the identifier of the file;
select a storage server from each of the acquired storage server groups respectively, and access data chunks included in the file from the respective storage servers selected from each of the storage server groups according to the identifier of the file; and
select another storage server from the storage server group that comprises a certain storage server, and access a respective data chunk included in the file from the selected storage server according to the identifier of the file, when an accessing from the certain storage server fails.

16. The system according to claim 15, characterized in that, the management server is also configured to:
acquire a correspondence between disk identifiers and the identifiers of the files corresponding to the storage server groups;
acquire identifiers of disks for storing the file from the correspondence between the disk identifiers and the identifiers of the files corresponding to the storage server groups, according to the identifier of the file; and
access data chunks included in the file from the respective storage servers selected from the storage server groups according to the identifier of the file and the disk identifiers for storing the file.

17. The system according to claim 15, characterized in that, the management server is also configured to:
acquire a correspondence of the identifiers of the files corresponding to the storage server groups, disk identifiers and the offsets of divided chunks;
according to the identifier of the file, acquire identifiers of disks for storing the file and the offsets for storing the divided chunks included in the file in the disk from the correspondence of the identifiers of the files corresponding to the storage server groups, the disk identifiers and the offsets of the divided chunks; and
access data chunks included in the file from the respective storage servers selected from each of the storage server groups, according to the identifiers of disks for storing the file and the offsets for storing the divided chunks included in the file in the disk.

18. The system according to claim 15, characterized in that, the client is also configured to send a file writing request to the management server, wherein a file to be written is carried in the file writing request, the file to be written includes the identifier, size, contents, type information of the file;
accordingly, the management server is also configured to:
receive the file writing request sent from the client;
according to an identifier of the file to be written, acquire one or more storage server groups corresponding to the file to be written, wherein the management server stores a correspondence between identifiers of the files and the storage server groups;
according to one or more acquired storage server groups, dividing the file to be written into one or more data chunks, wherein the divided data chunks are in a one-to-one correspondence with the storage server groups; and
in each storage server included in every storage server group, determine an identifier of disk for storing divided chunks of each of the data chunks included in the file, and write the divided chunks into disks corresponding to the disk identifiers.

19. The system according to claim 18, characterized in that, the management server is further configured to generate and store a correspondence between the identifier of the file and the disk identifiers, according to the identifier of the file to be written and the identifiers of the disks for storing the divided chunks of each of the data chunks included in the file.

20. The system according to claim 18, characterized in that, the management server is further configured to determine identifiers of disks for storing the divided chunks of each of the data chunks included in the file in each storage server included in every storage server group, and to determine offsets in the disks for storing the divided chunks of each of the data chunks included in the file, according to the identifiers of disks for storing the divided chunks of each of the data chunks included in the file; and to store the divided chunks of each of the data chunks included in the file into disks corresponding to the disk identifier, according to the offsets for storing the divided chunks of each of the data chunks included in the file.

21. The system according to claim 20, characterized in that, the management server is further configured to generate and store a correspondence of the identifier of the file, the disk identifiers and the offsets of the divided chunks, according to the identifier of the file to be written, the identifiers of disks for storing the divided chunks of each of the data chunks included in the file and the offsets for storing the divided chunks of each of the data chunks included in the file.

22. The system according to claim 15, characterized in that the system further comprises a backup management server, wherein the backup management server is configured to replace the function of the management server when the management server malfunctions.

\* \* \* \* \*